Figure 1:
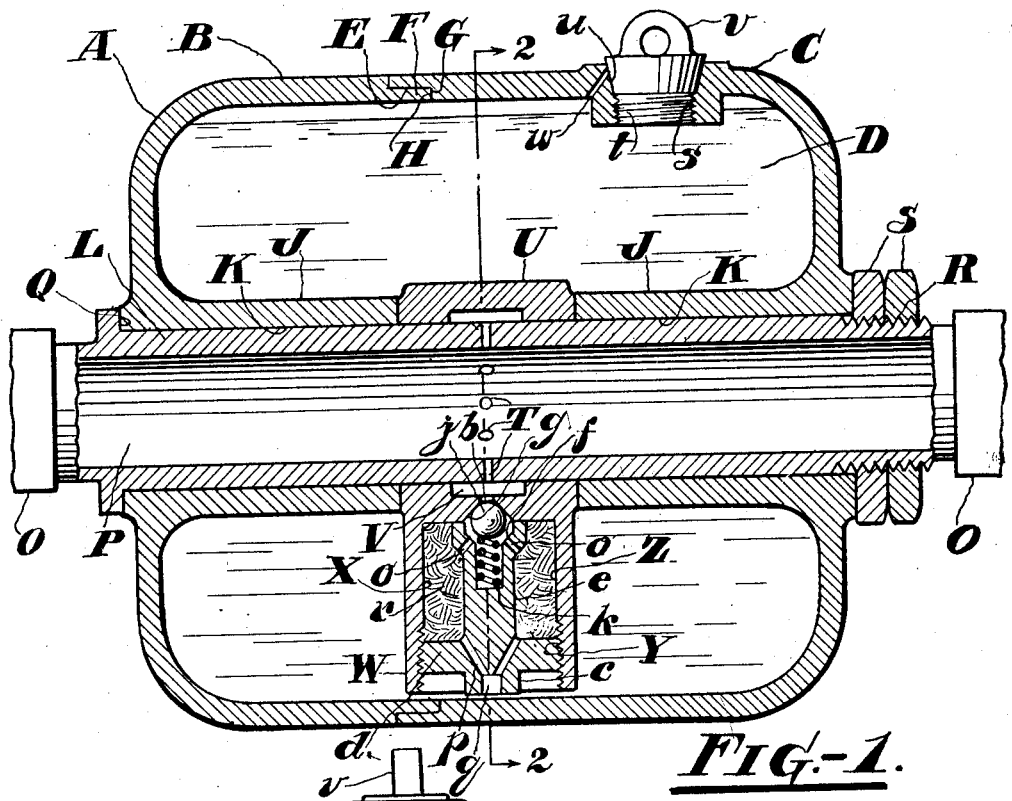

Oct. 30, 1928.

G. W. HULSHIZER

AIR LINE OILER

Filed May 25, 1927

1,689,780

INVENTOR.
George W. Hulshizer
BY Herbert K. Ogden
HIS ATTORNEY

Patented Oct. 30, 1928.

1,689,780

UNITED STATES PATENT OFFICE.

GEORGE W. HULSHIZER, OF STEWARTSVILLE, NEW JERSEY, ASSIGNOR TO INGERSOLL-RAND COMPANY, OF JERSEY CITY, NEW JERSEY, A CORPORATION OF NEW JERSEY.

AIR-LINE OILER.

Application filed May 25, 1927. Serial No. 194,081.

This invention relates to oiling devices, but more particularly to an air line oiler adapted to be attached to the pressure fluid supply line leading from a source of supply to a fluid actuated machine, such as a rock drill, air motor and the like.

An object of the invention is to supply lubricant in suitable quantities and in a properly atomized state to the working parts of a fluid actuated rock drill, or other machine, thus actuated, through the agency of the pressure fluid flowing through the supply line.

A further object is to enable substantially all of the oil to be exhausted from the oiler after each refilling, thus eliminating the necessity for frequent interruptions in the drilling operation in order to replenish the supply of oil in the reservoir.

Another object is to prevent an undesirable flood of oil into the supply line during the inoperative period of the machine to which the oil is being supplied.

Other objects will be in part obvious and in part pointed out hereinafter.

Figure 2:
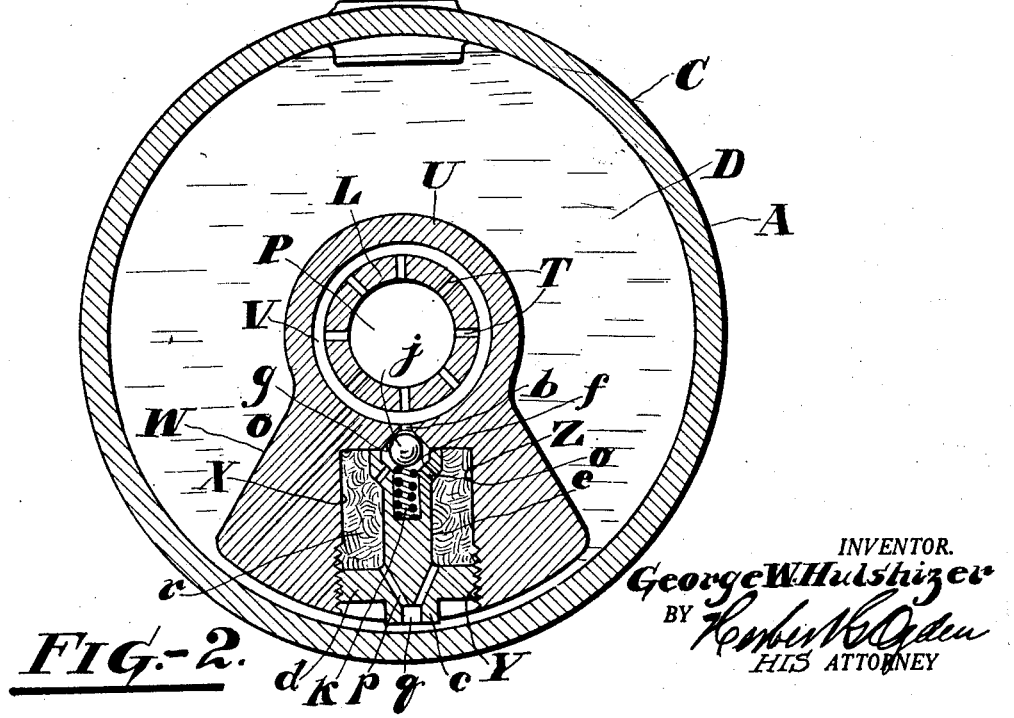

In the drawings, in which similar reference characters refer to similar parts,

Figure 1 is a sectional elevation of the oiler attached to a pressure fluid supply line, and Figure 2 is a transverse view taken through Figure 1 on the line 2—2, looking in the direction indicated by the arrows.

Referring to the drawings, A designates a casing comprising in this instance a pair of sections B and C, the interior D of which forms a reservoir for oil or other suitable lubricant. The sections B and C are preferably so formed that one will slightly overlap the other, this is accomplished in the present instance by forming an annular recess E in the casing section C and into this recess E extends a flange F on the casing section B.

Preferably the end surface G of the flange F abuts the end wall H of the recess and these surfaces may be so machined as to form a fluid tight joint therebetween to prevent leakage of oil and pressure fluid from the reservoir D.

Extending into the casing sections and located preferably centrally with respect thereto are projections J having bores K therethrough for the reception of a tube L which may be secured at its ends to a hose or pipe line O in any suitable and well known manner. The passageway P in the tube L thus forms a portion of the hose line for conveying pressure fluid from one section of the hose line O to the other.

An additional function of the tube L is to hold the casing sections B and C in fluid tight engagement with each other. This, in the present instance, is accomplished by forming a shoulder Q near one end of the tube to abut the casing section B and by threading the opposite end of the tube as at R to receive a nut or nuts S which may be screwed firmly against the casing section C.

Suitable means are provided for establishing communication between the interior of the tube L and the reservoir D for the purpose of admitting pressure fluid into the reservoir D to create a pressure on the surface of the oil and also for conveying oil in a suitably atomized state from the reservoir into the passageway P. To this end, a plurality of transverse passages T are formed in the walls of the tube L, preferably mid-way between the free ends of the projections J. On the tube L is disposed a sleeve U which may abut with its ends the projections J and has an annular internal groove V wherewith the passages T communicate with their outermost ends.

In the present instance the sleeve U carries an eccentrically disposed weight W preferably formed integrally with the sleeve U and of a length to extend with its outermost end to a point near the wall of the reservoir D. The weight W is preferably of such proportions that the sleeve U will at all times be maintained in substantially the same position and in this way also a recess X in the outermost portion of the weight W will at all times remain adjacent the lowermost side of the reservoir D.

The recess X in this instance comprises an outer threaded portion Y and an inner smooth cylindrical portion Z which communicates with the annular groove V through a passage $b$ adjacent the inner end of the recess X.

The recess X is preferably of rather large cross sectional area and in the outer end thereof is screwed a plug $c$ having a threaded flange $d$ for cooperation with the threaded portion Y of the recess and a central stem $e$. In the innermost end of the stem $e$ is formed a valve seat $f$ which registers with a similar seat *q* at the outermost opening of the passage *b* in the weight W. Disposed between the valve seats *f* and *g* is a valve *j*, preferably in the form of a ball, adapted to be normally pressed to the seat *g* by a spring *k* located in the stem *e*.

Preferably the stem *e* of the plug *c* is of such length that its free end may abut the end wall of the recess X, thus limiting the distance which the plug *c* may be screwed into the recess.

In order to afford communication between the pasage *b* and the reservoir D, a plurality of passages *o* are formed in the free end of the stem *e* to lead to the recess X and at the outer end of the plug are formed similar passages *p* for establishing communication between the recess X and the reservoir. In this instance the passages *p* open at their outer ends into a small recess *q* in the outer end of the plug *c*.

In order to insure proper atomization of the oil and thus reduce it into a state in which it may be readily conveyed to the machine to be lubricated, suitable absorbent material or felt *r* is disposed in the recess X about the stem *e*. The felt *r* may be of such quality that the oil may be readily forced therethrough and also that it will act to remove any foreign matter which may be entrained in the oil.

The oil may be introduced into the reservoir D through an aperture *s* in the casing A, in this instance, in the section C. The aperture *s* comprises an inner threaded portion *t* and an outer smooth tapered portion *u*. A plug *v* screwed into the aperture *s* thus cooperates with the tapered portion *u* for sealing the reservoir D.

To the end that any pressure fluid which may remain entrapped in the reservoir D, after the supply of pressure fluid in the hose line has been cut off, may be gradually exhausted from the reservoir prior to the refilling of the same a passage *w* is formed in the casing section C to communicate at one end with the reservoir D and at its outer end with the tapered portion *u* of the aperture *s*.

The operation of the device is as follows: Upon the admission of pressure fluid into the hose line, a portion thereof will pass the passages T, *b*, *o*, thence through the recess X in the passages *p* into the reservoir to create a pressure on the surface of the oil. Pressure fluid will thus continue to flow into the reservoir through these passages until the pressure within the reservoir reaches that value at which it may, together with the pressure exerted by the spring *k*, overcome the pressure in the hose line and close the valve *j*. Thereafter, when the drill or machine to which the pressure fluid is being supplied, is set in operation, the pulsations occurring in the pressure fluid will unseat the valve *j* and the air pulsating into and out of the recess X through the passages *b* and T will convey a portion of oil in the form of a mist into the passageway P. At this point the oil will mingle with the pressure fluid and be carried thereby to the drill.

By reason of the pressure which is maintained within the reservoir D the felt *r* will at all times be saturated with oil and in this way a supply of lubricant in suitable quantities will at all times be in readiness adjacent the passages *o* to be carried into the air current flowing through the hose line. In this way the oil will be conveyed from the reservoir in uniform quantities and the chances of introducing an excessive quantity of oil into the air current are thus eliminated.

After the last pulsations into the reservoir, that is, after the drill ceases its reciprocations, the pressure fluid in the reservoir will be entrapped therein by the valve *j*. This is a desirable feature in oilers of this type since it precludes the possibility of emptying the reservoir into the hose line during the inoperative period of the drill.

Pressure fluid will, of course, also be entrapped in the reservoir after the supply of oil has been exhausted therefrom. In such case, the pressure fluid may be exhausted from the reservoir through the passageway *u* by partly unscrewing the plug *v* to a point where the threads of the plug and the aperture *s* will still be in engagement. By thus providing an escape for the entrapped pressure fluid in the manner described the plug *v* may be unscrewed with entire safety as the pressure fluid will be completely exhausted from the reservoir before the plug *v* is unscrewed from the aperture *s*.

I claim:

1. An air line oiler comprising a plurality of casing sections forming a reservoir for oil, means for holding the sections in fluid tight engagement with each other, said means having a passageway for conveying pressure fluid through the casing, and means rotatable about said means for conveying pressure fluid from the passageway into the reservoir and oil from the reservoir into the passageway.

2. An air line oiler comprising a plurality of casing sections forming a reservoir for oil, means for holding the sections in fluid tight engagement with each other, said means having a passageway for conveying pressure fluid through the casing, and means associated with said means for conveying pressure fluid from the passageway into the reservoir and oil from the reservoir into the passageway.

3. An air line oiler comprising two casing sections forming a reservoir for oil, inwardly extending hollow projections in the sections, a tube in the projections forming a passageway through the casing for pressure fluid, means on the tube forcing the adjacent ends of the sections into fluid tight engagement with each other, a sleeve rotatable about the tube carrying an eccentrically disposed weight adapted to rock to the lowermost side of the reservoir, and passages in the tube and the weight conveying pressure fluid from the interior of the tube into the reservoir and oil from the reservoir into the tube to mingle with the pressure fluid flowing therethrough.

4. An air line oiler comprising two casing sections forming a reservoir for oil, inwardly extending hollow projections in the sections, a tube through the projections forming a passageway for pressure fluid, means on the tube for forcing the adjacent ends of the sections into fluid tight engagement with each other, said tube having a transverse passage, a sleeve on the tube between the projections carrying an eccentrically disposed weight whereby the sleeve is rotated on the tube, a passage in the weight adapted to register with the transverse passage for conveying pressure fluid from the tube into the reservoir and oil from the reservoir into the tube and a spring pressed valve in the weight controlling communication between the passages.

5. An air line oiler comprising two casing sections forming a reservoir for oil, hollow projections in the sections disposed coaxially with respect to each other, a tube in the projections forming a passageway for pressure fluid, means on the tube including a shoulder and a nut for pressing the adjacent ends into fluid tight engagement with each other, said tube having a transverse passage, a hollow sleeve rotatable on the tube carrying an eccentrically disposed weight adapted to rock to the lowermost side of the casing, said weight having a recess, a plug in the recess having a passage adapted to communicate with the passage in the tube for conveying pressure fluid and oil, a spring-pressed valve in the plug controlling communication between the passages, and absorbent material in the recess for insuring a uniform delivery of oil into the tube.

In testimony whereof I have signed this specification.

GEORGE W. HULSHIZER.